United States Patent
Lindteigen et al.

(10) Patent No.: US 9,088,538 B2
(45) Date of Patent: Jul. 21, 2015

(54) SECURE NETWORK STORAGE

(71) Applicants: Ty Brendan Lindteigen, Chandler, AZ (US); John Curtis, Chandler, AZ (US)

(72) Inventors: Ty Brendan Lindteigen, Chandler, AZ (US); John Curtis, Chandler, AZ (US)

(73) Assignee: SAIFE, Inc. AZ (US)

( * ) Notice: Subject to any disclaimer, the term of this patent is extended or adjusted under 35 U.S.C. 154(b) by 175 days.

(21) Appl. No.: 13/838,024

(22) Filed: Mar. 15, 2013

(65) Prior Publication Data

US 2014/0281526 A1    Sep. 18, 2014

(51) Int. Cl.
*H04L 29/06* (2006.01)
*G06F 21/00* (2013.01)
*H04L 9/00* (2006.01)

(52) U.S. Cl.
CPC .............. *H04L 63/00* (2013.01); *G06F 21/00* (2013.01); *H04L 63/0442* (2013.01); *H04L 9/006* (2013.01); *H04L 63/0272* (2013.01); *H04L 63/107* (2013.01)

(58) Field of Classification Search
None
See application file for complete search history.

(56) References Cited

U.S. PATENT DOCUMENTS

| | | | |
|---|---|---|---|
| 6,061,692 A * | 5/2000 | Thomas et al. | 707/613 |
| 8,825,597 B1 * | 9/2014 | Houston et al. | 707/610 |
| 2012/0144464 A1 * | 6/2012 | Fakhrai et al. | 726/6 |
| 2012/0297189 A1 * | 11/2012 | Hayton et al. | 713/165 |
| 2012/0317077 A1 * | 12/2012 | Chung | 707/634 |
| 2013/0007189 A1 * | 1/2013 | May et al. | 709/213 |
| 2013/0290256 A1 * | 10/2013 | Barrall et al. | 707/634 |
| 2014/0165167 A1 * | 6/2014 | Nunn et al. | 726/6 |

* cited by examiner

*Primary Examiner* — Justin T Darrow
*Assistant Examiner* — Andrew Steinle

(57) ABSTRACT

This invention includes a synchronized storage server enabled to send the end-point device a notification including the root folder list. The end-point device compares the sent root folder list to a previously stored root folder list in the end-point devices' memory. If the end-point device detects either a new root folder on the synchronized storage server, a change in an existing folder, or deleted content in a folder the end-point device will determine that a change is required to the stored data. Next the end-point device will synchronize with the synchronized storage server and create a new storage list. Finally, the synchronized storage server will send the end-point device a new encrypted folder encryption key which includes the encrypted file contents along with identifying information such as the server name and revision information.

15 Claims, 3 Drawing Sheets

SECURE NETWORK STORAGE

FIELD OF THE INVENTION

This invention relates generally to the field of data storage, and particularly methods, apparatuses, and systems for securely storing data in an unsecure server that can be accessed later from a secure end-point.

BACKGROUND OF THE INVENTION

The use of cloud base storage has increased tremendously. Cloud storage includes networked online storage such as data stored in virtualized pools of storage generally hosted by third parties. An entire ecosystem exists including companies that operate large data centers to serve people and entities that require data to be hosted. The data center operators may virtualize the resources according to the user's requirements, providing customers to vast storage resources, which the customers can use to store files or data objects. The resources may span across multiple physical servers.

There are many advantages to cloud storage including having to only pay for the storage actually used. In addition, entities may choose between off-premise and on-premise cloud storage options, or a mixture of the two options, to optimize other criteria such as cost savings potential, continuity of operations, disaster recovery, and security. Secondary advantages include a reduction in overhead cost as tasks are offloaded to a third party such as storage maintenance tasks, purchasing additional storage devices. These benefits allow entities to focus on their core business. However, cloud computing security is a tradeoff that users face.

A major problem with cloud-based storage involves securing the data to prevent the data from being accessed from unauthorized use. There are a number of security issues associated with cloud computing. Typically the security issues are dealt with by the cloud, or remote storage, providers. However, the data users also face issues and can benefit from taking control of security measures that prevent unauthorized use. The cloud provider is generally responsible to ensure that their infrastructure is secure and data is protected. But generally, there are few options the data creator has to protect the data before it is stored on the cloud.

This invention provides a unique solution for securely storing data wherein the data is encrypted at the source and not at the destination storage device. The invention includes a system and methods for encrypting data at the source, i.e. the client device or end-point, as well as storing and managing revisions of the data as it is used and changed by other secure devices and stored in the cloud. This invention enables a user of an end-point device to upload files onto network storage for backup and sharing with other end-point devices while providing automatic synchronization of the stored data across many devices. The invention also enables sharing with multiple users while using access privileges on a per folder or per object basis. The data is enabled to be encrypted locally on the end-point device before the data is sent to the cloud storage, such that the data on the network storage is always encrypted. The invention also encrypts the key for the files for each recipient to enable a cryptographically enforced access control. In addition, the invention enables different permission properties for each folder.

BRIEF SUMMARY OF THE INVENTION

One embodiment of the invention is a system for securing data comprising an end-point device with an application stored in the end-point device configured to secure an authenticated communication between the end-point device and a synchronized storage server via a communication network. Next a synchronized storage server including an application stored within the server is configured to send the end-point device a notification including a root folder list. The synchronized storage server may include any type of data hierarchy storage system such as a file, folder, or database. Next, the end-point device's application is further configured to compare the sent root folder list to a previously stored root folder list in the end-point device's memory and determine if there is a new folder either on the synchronized storage server or on the end-point device, a change in content in an existing folder on either device, or if content has been deleted in an existing folder on either device. And when such a determination is made, the end-point device will synchronize with the synchronized storage server. If the change made to the folder originated at the end-point device, then the end-point device uploads the latest encrypted files to the server. Likewise if the change made to the folder originated at another end-point device, i.e. the root folder list is different than the end-point device's folder list, then the end-point device downloads the latest encrypted files from the server. The synchronization process is repeated until all changed data is synchronized. The synchronized storage server will also update the root folder list and provide an updated root folder list to the end point devices.

In addition the synchronized storage server may include an access control list to manage permissions to the folders and data. Finally, the synchronized storage server may send the end-point device a new encrypted folder encryption key, for example, when an end-point device's permissions to the folder and objects have been revoked.

Another embodiment of the invention is a process for securing data in a remote storage where an end-point device does not have direct access to the storage device to secure the data, or the end-point device does not trust the storage device to adequately secure the data, comprising first securing an authenticated communication link between the end-point device and a synchronized storage server via a communication network. Next the synchronized storage server sends the end-point device a notification including a root folder list. Next, the end-point device compares the root folder list to a previously stored root folder list in the end-point device's memory to detect if there is a new folder either on the synchronized storage server or on the end-point device, or a change in content in an existing folder on either device, or if content has been deleted in an existing folder on either device. And when such detection is made, the end-point device will synchronize with the synchronized storage server. If the change made to the folder originated at the end-point device, then the end-point device uploads the latest encrypted files to the server. Likewise if the change made to the folder originated at another end-point device, i.e. the root folder list is different than the end-point device's folder list, then the end-point device downloads the latest encrypted files from the server. The synchronization process is repeated throughout the folder hierarchy for each root folder until all changed folders and content are synchronized. The synchronized storage server will also update the root folder list and provide an updated folder list to the end point devices.

Finally, the synchronized storage server will send the end-point device a new encrypted folder encryption key which includes the encrypted file contents along with identifying information such as the server name and revision information.

Another embodiment of the invention is a process for packaging encrypted folders for storage on a remote storage server so that changes to the contents of the encrypted folders can be detected without having access to the encrypted folder's contents comprising the source end-point device encrypting the folder using a unique folder encryption key. Next the encrypted data folder and folder encryption key is sent, via a secure tunnel through a communication device, to the synchronized storage server. The synchronized storage server then encrypts the folder encryption key multiple times. The folder encryption key is encrypted once for each end-point device using the public key for each end point device. The synchronized storage server stores the encrypted folder and each encrypted folder encryption key file in the synchronized storage server's memory. The synchronized storage server also creates a root folder list which may include non-sensitive (unencrypted) data such as a list of all available objects (e.g. folders), object names (e.g. file names), object size (e.g. file size), and number of objects (e.g. number of files); and sensitive (encrypted) data such as object salt (e.g. file salt), file names (e.g. file names), creation date, modification date, plaintext object contents (e.g. plaintext object contents), and object sizes (e.g. file sizes). The synchronized storage server sends the root folder list to all end-point devices so the end-point devices can determine if they need to synchronize folders with the synchronized storage server. Next, the end-point device compares the root folder list to a previously stored root folder list in the end-point device's memory to detect if there is a new folder either on the synchronized storage server or on the end-point device, or a change in content in an existing folder on either device, or if content has been deleted in an existing folder on either device. And when such detection is made, the end-point device will synchronize with the synchronized storage server. If the change made to the folder originated at the end-point device, then the end-point device uploads the latest encrypted files to the server. Likewise if the change made to the folder originated at another end-point device, i.e. the root folder list is different than the end-point device's folder list, then the end-point device downloads the latest encrypted files from the server. The synchronization process is repeated throughout the folder hierarchy in the root folder until all changed folders and content are synchronized. The synchronized storage server will also update the root folder list and provide an updated folder list to the end point devices, as needed.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

The invention deals with data storage and is applicable to all data storage systems such as database and file folder type data systems. For example, objects and file folders are used to describe the location and hierarchy of stored data. The invention is applicable to all levels of data hierarchy, for example the invention is applicable to any arrangement of data consisting of sets and subsets such that every subset of a set is of lower rank than the set. Such terms associated with the various data storage systems are used interchangeably throughout the description and will be apparent to those skilled in the art.

Figure 1:
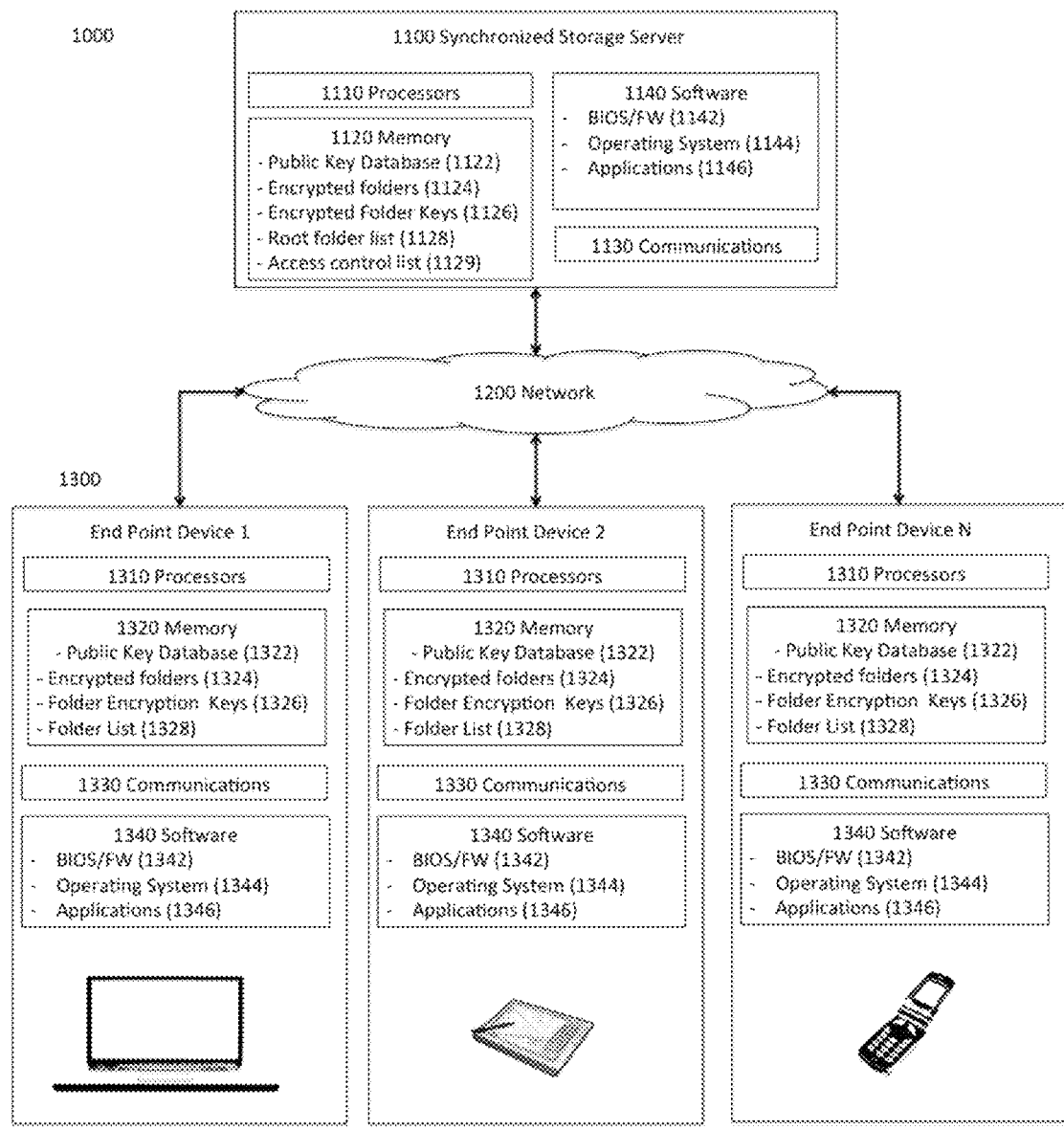
FIG. 1 is a diagram illustrating a system for securing data in a remote storage in accordance with the teachings of the present invention.

FIG. 1 is a diagram of an exemplary embodiment for a system 1000 for securing data comprising an end-point device 1300 with an application 1346 stored in the end-point device 1300 configured to secure an authenticated communication between the end-point device 1300 and a synchronized storage server 1100 via a network 1200. Upon start up, or at periodic intervals, or upon request, the end-point device 1300 will establish a secure and authenticated communication link with the synchronized storage server 1100. The secure and authenticated communication links may be established using standard cryptographic techniques.

The network 1200 may be either a wired or wireless communication network. The network 1200 may include a public or private network such as the internet, intranet, telecommunications system, or other network capable of transmitting electronic data.

The end-point device 1300 includes internal hardware such as a processor 1310, memory 1320, and communication 130 devices. The end-point device 1300 may include software applications 1346 that enable the end-point device 1300 to encrypt all data locally on the device before sending the data to the remote cloud storage, or synchronized storage server 1100. The data encryption may be accomplished using any data encryption method such as Advanced Encryption Standard ("AES").

The end-point device may include smart phones, tablet PC's, notebook PC's, desktop PC's, remote monitoring devices, cameras, sensors, or any other device that transmits data via a network. The devices may be used for any type of communication, computing, or electronic operation. The invention is also applicable to both mobile devices and fixed devices since either type are commonly used to transmit data to and from other mobile and fixed devices via a network.

Next the synchronized storage server 1100 includes an application 1146 stored within the server configured to send the end-point device 1300 a notification including a root folder list 1128. The synchronized storage server 1100 may include hardware such as a processor 1110, memory 1120, and communication 1130 devices. The synchronized storage server 1100 may include either a file system or database. In addition the synchronized storage server 1100 may include an access control list 1129 to manage permissions and synchronization to the folders and data.

The synchronized storage server 1100 essentially acts like a secure storage device that can be accessed asynchronously as a secure end-point by any number of end-point devices 1300. The synchronized storage server 1100 may comprise a physical storage device such as a hard drive, series of hard drives, SSD memory, SD Card, or any other type of local volatile or volatile memory. The synchronized storage server 1100 may also be a remote cloud storage service, such as Amazon Storage, Google Cloud Storage, or any other commercially available remote network storage service. The invention is also applicable to a synchronized storage server 1100 that uses cloud storage for the data, but maintains metadata and folder encryption keys locally on the server or device. The synchronized storage server 1100 only distributes the encrypted data and does not have any other direct access to the encrypted data.

The synchronized storage server 1100 provides remote memory for end-point devices 1300 to backup data and to share data with other devices. With respect to shared data, the synchronized storage server 1100 may also provide automatic synchronization to keep the data, or content, consistent across the multiple sharing devices. The synchronized storage server 1100 may also enable sharing data with multiple devices with access privileges managed on a per folder basis. And since the data is encrypted locally on the end-point device 1300, the synchronized storage server 1100 is always black, that is the synchronized storage server only carries segregated signals of encrypted information, or ciphertext signals, and does not contain sensitive data from end-point devices in any readable form. In addition, the synchronized storage server 1100 encrypts the folder encryption keys 1126 for the encrypted folders 1124 for each recipient to enable cryptographically enforced access control. The permission properties may also be enabled separately for each folder 1124.

The synchronized storage server 1100 stores the encrypted folders 1124 within a folder hierarchy as specified by a user. Along with each encrypted folder 1124 the synchronized storage server 1100 stores a signed-encrypted folder encryption key 1126 that is re-encrypted for each authorized user of each folder 1124. The synchronized storage server 1100 also stores a permission list per folder 1124, as an access control list 1129. The synchronized storage server 1100 is able to send an encrypted folder encryption key 1126 to each end-point device 1300 that has permission to access the folder 1124.

In one embodiment, the folder permissions apply to all files in a folder 1124 equally with no per-file permissions. Each file in a folder 1124 shares a unique cryptographic folder encryption key 1124. This reduces the over use issues associated with encrypting several files with the same key in cipher-block chaining (CBC) mode. This also reduces permission removal and revocation issues as the change on one folder would result in all files in the same folder being re-encrypted. In addition, new folders have the option to inherit permissions from a parent folder; however, the new folders may still get a unique folder encryption key. Permissions are copied into a local ".perm" file with property status noted the same as the parent folder. In this way, if a root parent folder changes, the system will keep flowing down until a child is reached with different permission properties than the parent. In addition, only read or only write file permissions result in a one-way synchronization. Whereas, read and write file permissions may result in two-way synchronization.

In another embodiment, the invention is still applicable to data subsets, such as files within a folder. Along with each encrypted file the synchronized storage server 1100 stores a signed-encrypted file encryption key that is re-encrypted for each authorized user of each file. The synchronized storage server 1100 also stores a permission list per file, as an access control list. The synchronized storage server 1100 is able to send an encrypted file encryption key to each end-point device 1300 that has permission to access the file.

Each file may share a unique cryptographic file encryption key. This also reduces permission removal and revocation issues as the change on one file would result in all data in the same file being re-encrypted. In addition, new files have the option to inherit permissions from a parent file; however, the new files may still get a unique file encryption key. Permissions are copied into a local ".perm" file with property status noted the same as the parent file. In this way, if a root parent file changes, the system will keep flowing down until a child is reached with different permission properties than the parent. In addition, only read or only write data permissions result in a one-way synchronization. Whereas, read and write data permissions may result in two-way synchronization.

Next, the end-point device's application 1346 is configured to compare the sent root folder list 1128 to a previously stored root folder list 1328 in the end-point device's memory 1320. The end-point device 1346 compares the root folder list 1128 to a previously stored root folder list 1328 to detect if there is a new folder on either the synchronized storage server 1100 or on the end-point device 1346, or a change in content in an existing folder on either device, or if content has been deleted in an existing folder on either device. And when such detection is made, the end-point device 1300 will synchronize with the synchronized storage server 1100. If the change made to the folder originated at the source end-point device 1300, then the end-point device 1300 uploads the latest encrypted folders to the synchronized storage server 1100. Likewise if the change made to the folder originated at another end-point device, i.e. the root folder list 1128 is different than the end-point device's folder list 1328, then the end-point device 1300 downloads the latest encrypted folders from the synchronized storage server 1100. The synchronization process is repeated throughout the folder hierarchy under the root folder until all changed folders and object content are synchronized. The synchronized storage server 1100 will also update the root folder list and provide an updated root folder list to the end point devices.

Finally, the synchronized storage server 1100 will send the end-point devices 1300 a new encrypted folder encryption key. The end-point device 1300 is then able to locally decrypt the folder encryption key using the end-point device's private key, using public-key cryptography. With the encrypted folder encryption key 1326, the end-point device 1300 can decrypt the data.

Figure 2:
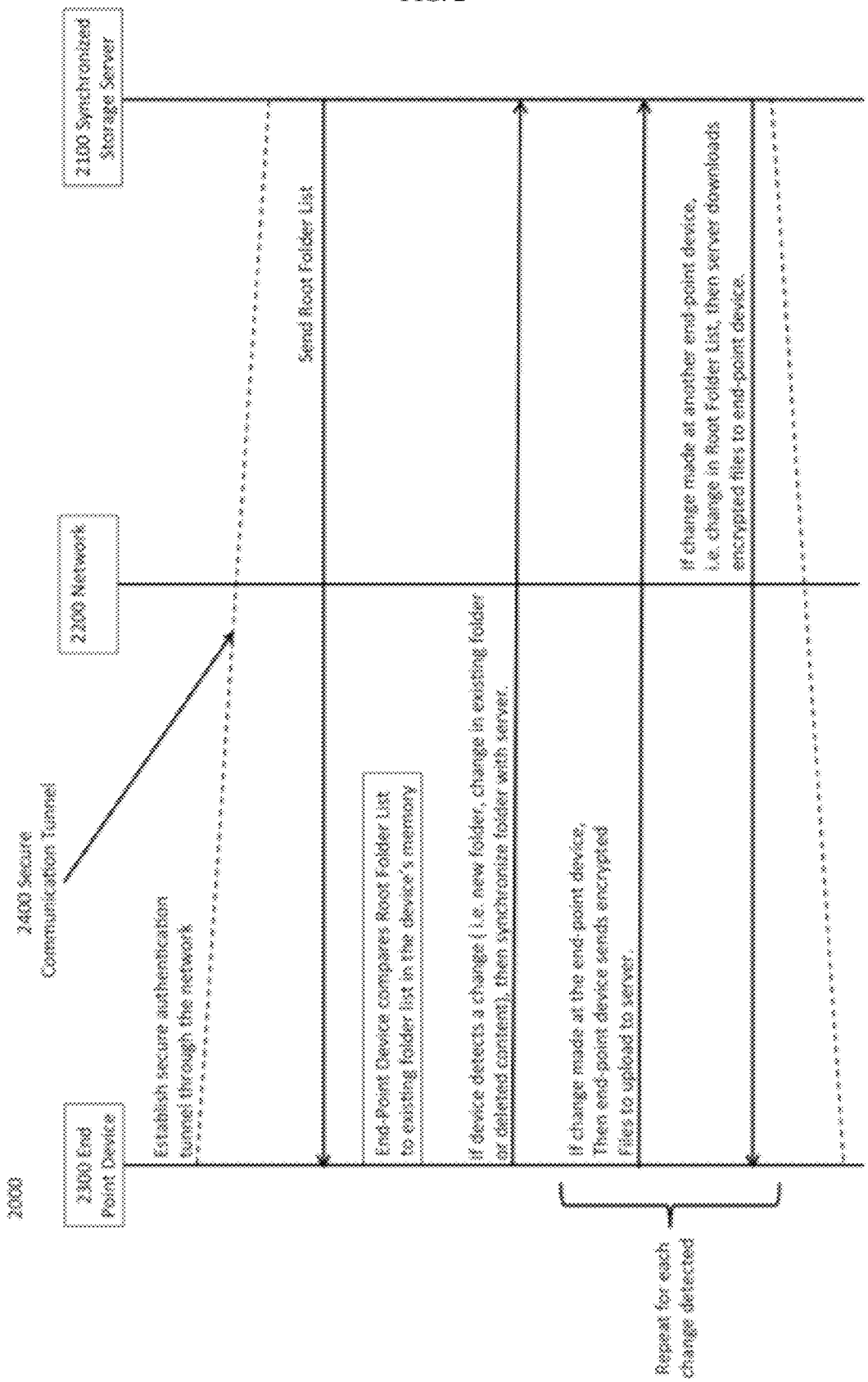
FIG. 2 is a diagram of an exemplary embodiment for a process to secure data in a remote storage in accordance with the teachings of the present invention.
Figure 3:
FIG. 3 is a diagram of an exemplary embodiment for a process to securely package data for remote storage in accordance with the teachings of the present invention.

FIG. 2 is a diagram of an exemplary embodiment for a method 2000 for securing data in a remote synchronized storage server 2100 where an end-point device 2300 does not have direct access to the synchronized storage server 2100 to secure the data, or the end-point device 2300 does not trust the remote storage to adequately secure the data, comprising first securing an authenticated communication link 2400 between the end-point device 2300 and a synchronized storage server 2100 via a communication network 2200. Upon start up, or at periodic intervals, or upon request, the end-point device 2300 will establish a secure and authenticated communication link 2400 with the synchronized storage server 2100. The secure and authenticated communication links 2400 may be established using standard cryptographic techniques.

The synchronized storage server 2100 sends the end-point device 2300 a message including a root folder list. The end-point device 2300 compares the root folder list to a previously stored root folder list in the end-point device's memory to detect if there is a new folder either on the synchronized storage server 2100 or on the end-point device 2300, or a change in content in an existing folder on either device, or if content has been deleted in an existing folder on either device. And when such detection is made, the end-point device 2300 will synchronize with the synchronized storage server 2100. If the change made to the folder originated at the end-point device 2300, then the end-point device 2300 uploads the latest encrypted folders to the synchronized storage server 2100. Likewise if the change made to the folder originated at another end-point device, i.e. the root folder list is different than the end-point device's folder list, then the end-point device 2300 downloads the latest encrypted folders from the synchronized storage server 2100. The synchronization process is repeated until all changed folders are synchronized.

The synchronized storage server 2100 will also update the root folder list and provide an updated folder list to the end-point devices 2300. In order for the files to be read, the end-point device 2300 must have read permissions to retrieve the files from the synchronized storage server 2100. Likewise, the end-point device 2300 must have write permissions to send new files or file updates to the synchronized storage server 2100. In order to remove files from the synchronized storage server 2100, the end-point device 2300 must have both read and delete permissions. In other words, deleting data requires that the end-point device 2300 is able to read the data from the synchronized storage server 2100 into the device's local memory, and then the end-point device 2300 must be able to remove the data from the end-point device's local memory for a local change to be detected, and then the change can be replicated on the synchronized storage server 2100 as a delete operation.

Again it is important to note the significance with file permissions. Recall that there is only one folder encryption key per folder. Each folder encryption key is encrypted separately for each end-point device and each file within a folder is encrypted with the same folder encryption key. The folder encryption key must also change when an end-point device is removed from the access control list. The invention also enables previously authorized end-point devices to be restricted from accessing data when the files are re-encrypted with a new key by simply not sending the new keys to unauthorized end-point devices.

Finally, the synchronized storage server 2100 will send the end-point devices 1300 a new encrypted folder encryption key. The end-point devices 1300 are then able to locally decrypt the folder encryption key using the end-point devices' private keys, using public-key cryptography. With the encrypted folder encryption keys 1326, the end-point devices 1300 can decrypt the folders.

Another embodiment of the invention is a process for packaging encrypted files for storage on a remote synchronized storage server 3100 so that changes to the contents of the encrypted files can be detected without having access to the encrypted file's contents comprising the source end-point device 3300 encrypting the file using a unique folder encryption key.

Next the encrypted data folder and folder encryption key is sent, via a secure tunnel 3400 through a communication network, to the synchronized storage server 3100. The synchronized storage server 3100 then encrypts the folder encryption key multiple times. The folder encryption key is encrypted once for each end-point device 3300 using the public key for each end point device 3300. The synchronized storage server 3100 stores the encrypted folder and each encrypted folder encryption key file in the synchronized storage server's memory. The synchronized storage server 3100 also creates a root folder list which may include non-sensitive (unencrypted) data such as a list of all available folders, file names, file size, and number of files; and sensitive (encrypted) data such as file salt, file names, creation date, modification date, plaintext file contents, and file sizes.

The synchronized storage server 3100 sends the root folder list to all end-point devices 3500 so the end-point devices 3500 can determine if they need to synchronize files with the synchronized storage server 3100. Next, the end-point devices 3500 compare the root folder list to a previously stored root folder list in the end-point devices' 3500 memory to detect if there is a new folder either on the synchronized storage server 3100 or on the end-point devices 3500, or a change in content in an existing folder on either device, or if content has been deleted in an existing folder on either device. And when such detection is made, the end-point devices 3500 will synchronize with the synchronized storage server 3100. Then the end-point devices 3500 download the latest encrypted folders from the synchronized storage server 3100. The synchronization process is repeated throughout the folder hierarchy under the root folder until all changed folders and object content are synchronized. The synchronized storage server 3100 will also update the root folder list and provide an updated folder list to the end point devices 3500.

The invention also enables a virtual dead drop. A traditional dead drop included a method to pass items between at least two individuals using a secret location and thus does not require them to meet directly. For example, a dead drop may permit a case officer and agent to exchange objects and information while maintaining operational security. The virtual dead drop is accomplished when a first end-point device is enabled with write but not read permissions, and a second end-point device is enabled with read but not write permissions. The first end-point device can create a new, or update an existing data file in the synchronized storage server. The second device, which would have access to the same folder in the synchronized storage server, would then be able to read the files provided by the first end-point device. In this scenario, the first end-point device would be able to exchange digital objects and information with the second end-point device without "meeting directly" while maintaining operational security.

The invention also enables unique content rules to manage the use and distribution of the folders on the end-point devices. The folders may include rules such as temporal, location, identity, and activity/inactivity rules. Such rules may enhance the inventions ability to distribute data to end-point devices while preventing the data from spreading to unauthorized users. For example, the folders may include a rule to remove access to the folder when the folders have been inactive for a predetermined amount of time. Another such rule may include temporal rules where access to the folders is removed after a predetermined amount of time. For example, the folder may be made accessible to an end-point device for a limited time and when the limited time lapses access to the folder lapses. Another example of such a rule is when access to the folders is based on geospatial limitations. For example, an end-point device may be given access to folders only when the end-point device is within a geospatial boundary and access removed when the end-point device goes outside the geospatial boundary. It is important to note that access to the folders can be accomplished by deleting the folders, or access can be removed with a new encrypted folder encryption key distributed to all devices, except those with revoked access to the folders.

Throughout this description, references were made to devices coupled together. Such coupling includes a manner that allows the exchange and interaction of data, such that the operations and processes described may be carried out. For example, the devices may be coupled with electrical circuitry, or through wireless networks that allow the devices to transfer data, receive power, execute the operations described, and provide structural integrity. Reference was also made to interactions between end-point device 1300 in FIG. 1 and a synchronized storage server 1100 via a network 1200, however the invention is scalable to be enabled with more devices than described in the specification. For example, any number of end-point devices 1300, networks 1200, and synchronized storage servers 1100, may be utilized to enable this invention.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for securing data comprising:
   a change made to a folder originating at a first device resulting in the first device uploading a latest encrypted folder to a server;
   the server receiving the encrypted folder and a first folder encryption key from a first device, wherein the encrypted folder is encrypted using the first folder encryption key;
   the server storing the encrypted folder;
   the server referring to an access control list to identify a second device that is authorized to access the encrypted folder;
   the server encrypting the first folder encryption key with a public key of the second device to produce an encrypted first folder encryption key;
   the server creating a root folder list;
   the server sending the root folder list, encrypted folder, and encrypted first folder encryption key to the second device;
   the second device decrypting the encrypted first folder encryption key to produce the first folder encryption key;
   the second device using the first folder encryption key to decrypt the encrypted folder and produce a folder;
   the second device making a change to the folder, producing a changed folder;
   the second device encrypting the changed folder with a second folder encryption key to produce an encrypted changed folder;
   the second device sending the encrypted changed folder and the second folder encryption key to the server;
   the server storing the encrypted changed folder;
   the server referencing the access control list to determine if the first device is authorized to access the encrypted changed folder;
   the server encrypting the second folder encryption key with a public key for the first device to produce an encrypted second folder encryption key;
   the server creating an updated root folder list;
   the server sending the updated root folder list to the first device;
   the first device comparing the updated root folder list to a previously stored root folder list to detect the change to the folder;
   the first device requesting and receiving the encrypted changed folder and the encrypted second folder encryption key from the server;
   the first device decrypting the encrypted second folder encryption key to produce the second folder encryption key; and
   the first device using the second folder encryption key to decrypt the encrypted changed folder to produce the changed folder.

2. The method of claim 1, wherein the change comprises a new folder, or a change in content in the folder.

3. The method of claim 1, wherein the access control list and folder encryption key apply to all files in a folder.

4. The method of claim 1, wherein new folders have the option to inherit the permissions and folder encryption key from a parent folder or get unique permissions and a unique folder encryption key.

5. The method of claim 1, wherein a change made to the folder originating at the second device, results in the first device downloading the latest encrypted folder from the server.

6. The method of claim 1, wherein an unauthorized device is restricted from accessing an encrypted folder when the folder is encrypted with a new folder encryption key and the unauthorized device is not provided the second folder encryption key.

7. A method for packaging encrypted folders for storage on a remote storage server comprising:
   a server referencing a controlled access list to determine if a device is authorized to access an encrypted folder, wherein the encrypted folder was encrypted using a first folder encryption key;
   the server encrypting the first folder encryption key with a public key of the device, producing an encrypted first folder encryption key;
   the server creating a root folder list;
   the server sending the root folder list, the encrypted folder, and the encrypted first folder encryption key to the device;
   the device decrypting the encrypted first folder encryption key to produce the first folder encryption key;
   the device using the first folder encryption key to decrypt the encrypted folder and produce a folder;
   the device making a change to the folder, producing a changed folder, wherein the change made to the folder originates at the device, results in the device uploading the latest encrypted folder to the server;
   the device encrypting the changed folder with a second folder encryption key to produce an encrypted changed folder;
   the device sending the encrypted changed folder and the second folder encryption key to the server;
   the server referencing the access control list to determine if any other devices are authorized to access the encrypted changed folder;
   the server encrypting the second folder encryption key with a public key for each of the other devices determined to be authorized to access the encrypted folder, in order to produce a unique encrypted second folder encryption key for each of the other devices;
   the server sending the encrypted changed folder and the encrypted second folder encryption key for each of the other devices, respectively;
   at least one of the other devices decrypting the encrypted second folder encryption key to produce the second folder encryption key; and
   at least one of the other devices using the second folder encryption key to decrypt the encrypted changed folder to produce the changed folder.

8. The method of claim 7, wherein a virtual dead drop box is established by enabling a device with write but not read permissions, and enabling at least one of the other devices with read but not write permissions to the folder.

9. The method of claim 8, wherein the device can create a new, or update an existing folder in the server, and at least one of the other devices, which would have access to the folder in the server, accesses the folder, thus enabling the device to provide folders to at least one of the other devices without meeting directly and while maintaining operational security.

10. The method of claim 7, wherein the folder include management rules based on factors such as temporal, location, identity, and activity to prevent the folder from spreading to an unauthorized device, the temporal rules used to trigger the distribution of the root folder list and the synchronization process to revoke access to the folder.

11. The method of claim 10, wherein the folder includes a rule to revoke access to the folder when the folder has been inactive for a predetermined amount of time.

12. The method of claim 10, wherein the folder includes a temporal rule where access to the folder is revoked after a predetermined amount of time.

13. The method of claim 10, wherein the folder includes a rule where access to the folder is based on geospatial limitations including the device given access to the folder only when the device is within a geospatial boundary and access revoked when the device goes outside the geospatial boundary.

14. The method of claim 10, wherein an unauthorized device is restricted from accessing an encrypted folder when the folder is encrypted with a new folder encryption key and the unauthorized device is not sent to the new folder encryption key.

15. A non-transitory computer-readable medium which stores a set of instructions which when executed performs a method for packaging encrypted data for secure storage on a remote storage server, comprising:

storing in the server an application configured to effect: referencing a control access list to determine if a device is authorized to access an encrypted folder; encrypting the first folder encryption key with a public key of the device, producing an encrypted first folder encryption key; creating a root folder list; wherein a change made to the folder originates at the first device, resulting in the first device uploading the latest encrypted folder to the server; sending the root folder list, encrypted folder, and the first folder encryption key to the device; receiving an encrypted changed folder and a second folder encryption key from the device; referencing the control access device to determine if any other devices are authorized to access the encrypted changed folder; encrypting the second folder encryption key with a public key for each of the other devices determined to be authorized to access the encrypted folder to produce a unique encrypted second folder encryption key for each of the other devices; and sending the encrypted changed folder and the unique encrypted second folder encryption key for each of the other devices, respectively.

* * * * *